US006843549B2

(12) United States Patent
Cajigas et al.

(10) Patent No.: US 6,843,549 B2
(45) Date of Patent: Jan. 18, 2005

(54) LUBRICATING SYSTEM INCLUDING A LUBRICATING STRUCTURE

(75) Inventors: Elmer Samov Cajigas, Vancouver, WA (US); Wade Antoine Powell, Herzliya Pituach (IL); Rick Minoru Tanaka, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 168 days.

(21) Appl. No.: 10/269,379

(22) Filed: Oct. 10, 2002

(65) Prior Publication Data

US 2004/0080567 A1 Apr. 29, 2004

(51) Int. Cl.[7] ........................... B41J 2/165; B41J 11/22; F16C 17/00; F16C 33/10; F16N 1/00

(52) U.S. Cl. ............................. 347/22; 400/354; 184/5; 184/100; 384/13

(58) Field of Search ......................... 347/22, 37; 184/5, 184/100; 384/13; 400/692, 320, 354

(56) References Cited

U.S. PATENT DOCUMENTS 1,536,896 A 5/1925 Liorens
3,985,404 A 10/1976 Plaza et al.
4,452,542 A * 6/1984 Akazawa .................... 400/175

FOREIGN PATENT DOCUMENTS

JP 05031989 9/1993

* cited by examiner

*Primary Examiner*—Shih-Wen Hsieh

(57) ABSTRACT

A lubricating system includes a flexible, nominally planar lubricating structure including first and second end regions and a central region positioned therebetween. The lubricating structure is impregnated with a lubricating fluid and is adapted for securement to a printhead carriage only at said first and second end regions.

27 Claims, 2 Drawing Sheets

LUBRICATING SYSTEM INCLUDING A LUBRICATING STRUCTURE

BACKGROUND

Inkjet printing mechanisms, such as printers, may use print cartridges which shoot drops of liquid colorant, referred to generally herein as "ink," onto a print medium, such as a page of paper. Each print cartridge may have a printhead formed with very small nozzles through which the ink drops are fired. To print an image, the printhead, or a printhead carriage supporting the printhead, may be propelled back and forth across the page along a printhead carriage rod, shooting drops of ink in a desired pattern as it moves. The particular ink ejection mechanism within the printhead may be implemented in a variety of different ways, such as by piezo-electric or thermal printhead technology.

To enhance print quality, smooth motion of the printhead carriage along the carriage rod may be desired. However, during printing the carriage rod may become fouled with contaminants such as dust, ink aerosol particles, and print media particulate matter such as paper fibers. Such contaminants may interfere with smooth motion of the printhead carriage, thereby reducing print quality. The contaminants may cause friction between the printhead carriage and the carriage rod, thereby increasing strain on printer motors. The contaminants may also damage the printhead carriage or the carriage rod, thereby reducing the working life of the printer.

To clean and lubricate the carriage rod a lubricating pad, in the shape of a closed loop or a "doughnut", may be frictionally fit around a circumference of the carriage rod. An inner diameter of the closed pad may be made smaller than the outer diameter of the carriage rod to ensure intimate contact of the closed pad with the sliding surface of the rod so that lubricating fluid is imparted thereto. The lubricating pad may lubricate and clean around the entire circumference of the carriage rod as the closed pad is moved therealong. However, the tight fitting closed pad may impart a large drag to the printhead carriage thereby straining printer motors and inhibiting accurate movement of the printhead carriage. Moreover, slight variations in the diameters of different closed pads may result in different drag sensitivities of pads on different carriage rods, thereby reducing consistency in print quality between similarly produced printers. The doughnut shaped closed pad which completely encircles the carriage rod may require the carriage rod to be end-supported, which may facilitate vibration of the carriage rod during use. Such vibration may cause positional errors and print quality defects of the printhead.

SUMMARY OF THE INVENTION

A lubricating system includes a flexible, nominally planar lubricating structure including first and second end regions and a central region positioned therebetween. The lubricating structure is impregnated with a lubricating fluid and is adapted for securement to a printhead carriage only at said first and second end regions.

DETAILED DESCRIPTION OF THE DRAWINGS

Figure 1:
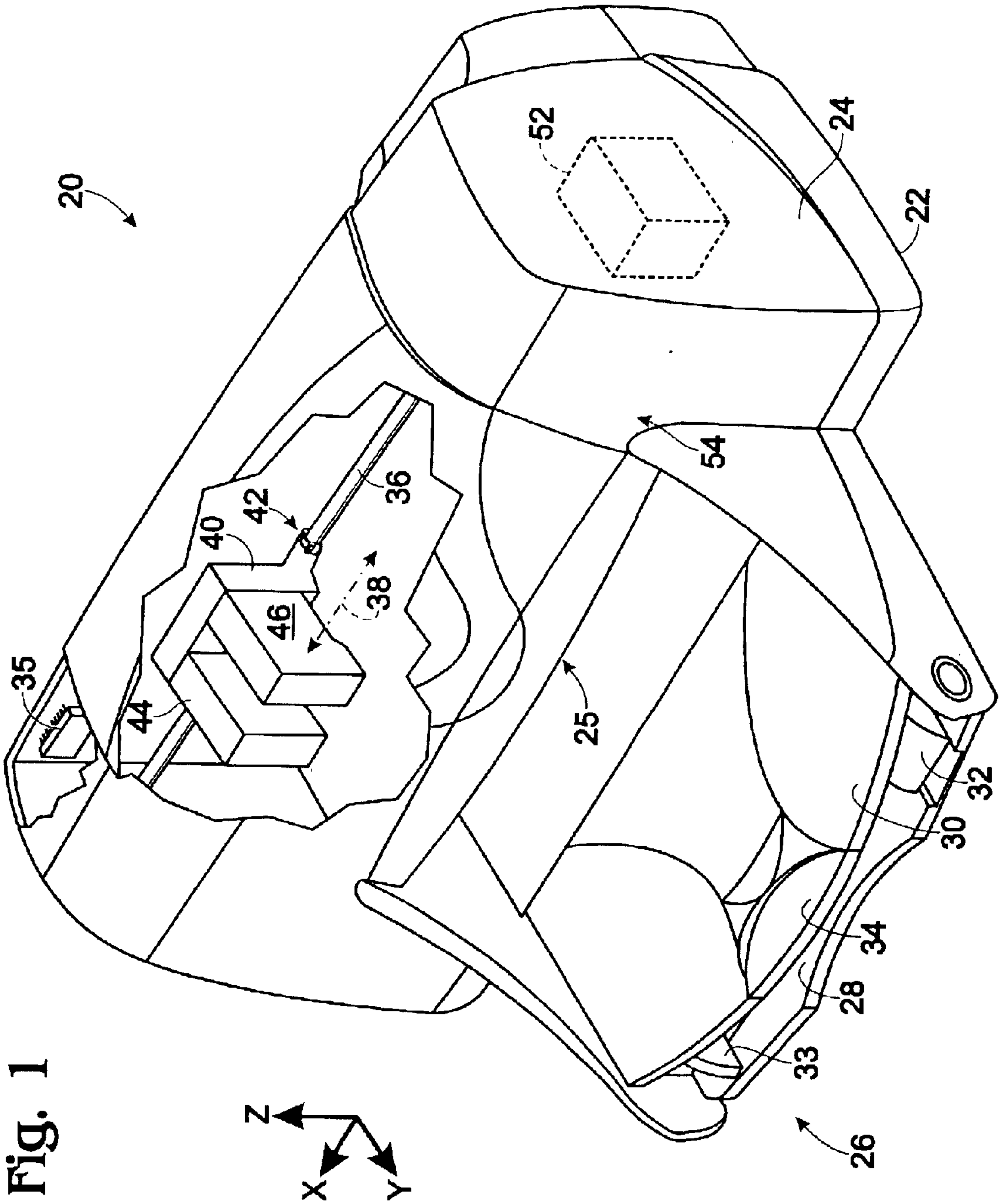
FIG. 1 is a perspective view of one embodiment of a printing mechanism including a lubricating system according to the present invention having a lubricating structure.

FIG. 1 illustrates one embodiment of a printing mechanism, here shown as an inkjet printer 20, which may be used for printing of business reports, correspondence, desktop publishing, and the like, in an industrial, office, home or other environment. A variety of printing mechanisms is commercially available, which frequently use inkjet or laser printing technology or the like. Some of the printing mechanisms that may use embodiments of the lubricating device include plotters, portable printing units, copiers, video printers, and facsimile machines, to name a few. For convenience the concepts of the lubricating device are illustrated in the environment of an inkjet printer 20.

While it is apparent that the printer components may vary from model to model, the inkjet printer 20 may include a chassis 22, such as a metal frame, surrounded by a housing or casing enclosure 24, typically manufactured of a polymeric material such as plastic. Sheets of print media are fed through a printzone 25 by a print media handling system 26. The print media may be any type of suitable sheet material, such as paper, card-stock, transparencies, mylar, and the like, but for convenience, the illustrated embodiment is described using paper as the print medium. The print media handling system 26 typically has a feed tray 28 for storing sheets of paper before printing. A series of motor-driven paper drive rollers (not shown) may be used to move the print media from tray 28 into the printzone 25 for printing. After printing, the sheet lands on output tray portion 30. The media handling system 26 may include a series of adjustment mechanisms for accommodating different sizes of print media, including letter, legal, A-4, envelopes, etc., such as a sliding length and width adjustment levers 32 and 33 for the input tray, and a sliding length adjustment lever 34 for the output tray.

The printer 20 also has a printer controller, illustrated schematically as a microprocessor 35, that receives instructions from a host device, typically a computer, such as a personal computer (not shown), communicatively coupled to printer 20 via electrical, optical, or RF methods and the like. Indeed, many of the printer controller functions may be performed by the host computer, by the electronics on board the printer, or by interactions therebetween. As used herein, the term "printer controller 35" encompasses these functions, whether performed by the host computer, the printer, an intermediary device therebetween, or by a combined interaction of such elements. The printer controller 35 may also operate in response to user inputs provided through a key pad (not shown) located on the exterior of the casing 24. A monitor coupled to the host computer may be used to display visual information to an operator, such as the printer status or the user interface of a particular program being run on the host computer.

Still referring to FIG. 1, a carriage guide rod 36, also called a carriage support member, a polished shaft or a support bar, may be mounted to chassis 22 to define a scanning direction or axis 38. The carriage rod 36 slideably supports a reciprocating printhead carriage 40, which may be an inkjet printhead itself or which may support at least one inkjet printhead such as a replaceable inkjet printhead, which travels back and forth across the printzone 25. A lubricating device 42 may be positioned on printhead carriage 40, and will be discussed in greater detail below with respect to embodiments of the present invention. In other embodiments the lubricating device may be positioned on a servicing sled or otherwise separate from the printhead carriage 40 but generally will be positioned adjacent the carriage rod.

The illustrated exemplary printhead carriage 40 carries two inkjet print cartridges 44 and 46 over the printzone 25 for printing, though any number or type of cartridges may be used. Each of the printheads may selectively eject droplets of ink onto a sheet of print media (not shown) in response to firing signals received from the controller 35, such as black ink from cartridge 44, and/or at least one colored ink from cartridge 46. It is apparent that any type of inks and/or colors may be used in cartridges 44 and 46, such as dye-based inks, pigment based inks, thermoplastic, wax or paraffin based inks, as well as hybrid or composite inks having both dye and pigment characteristics. The illustrated cartridges 44 and 46 may each include reservoirs for storing a supply of ink.

One suitable type of carriage support system is shown in U.S. Pat. No. 5,366,305, assigned to Hewlett-Packard Company, the assignee of the subject application. Any carriage propulsion system may be used to drive the printhead carriage 40, including a position feedback system, which communicates carriage position signals to the controller 35. For instance, a carriage drive gear (not shown) and a DC motor assembly 52 may be coupled to drive an endless belt secured to the carriage 40, with the motor operating in response to control signals received from the printer controller 35. To provide carriage positional feedback information to printer controller 35, an optical encoder reader (not shown) may be mounted to carriage 40 to read an encoder strip extending along the path of carriage travel.

Figure 2:
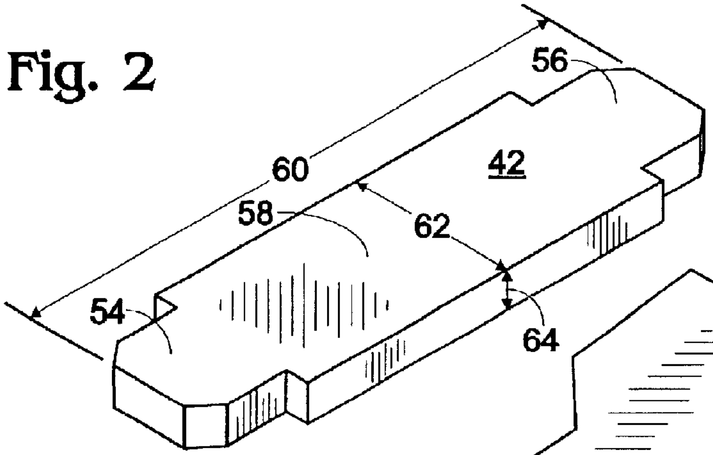
FIG. 2 is a perspective view of one embodiment of the lubricating structure of FIG. 1 according to the present invention.

FIG. 2 shows a detailed perspective view of lubricating structure 42, which functions as a lubricating pad, a cleaning device, and a friction reducing means. Pad 42 may comprise a flexible, nominally planar member or expanse including first and second end regions also called tabs, 54 and 56, respectively, and a central region 58, also called a span, positioned therebetween. The pad may be generally rectangular in shape and define a length 60, a width 62 and a thickness 64. Central region 58 may be more particularly defined as extending centrally along approximately 80% of length 60, whereas end regions 54 and 56 each generally extend along the 10%, respectively, of each end of length 60. In the embodiment shown length 60 may be approximately 22 millimeters (mm), width 62 may be approximately 10 mm, and thickness 64 may be approximately 1.5 mm. In many embodiments, the thickness 64 may be at least 10% of the length 60 and the width may be at least 50% of the length. However, any length, width, and thickness dimensions may be utilized as is desired for a particular application. End regions 54 and 56 as shown each have a width slightly smaller than width 62 of central region 58 so as to be secured within corresponding slots of printhead carriage 40, as will be discussed below. In other embodiments, end regions 54 and 56 may include other securement means such as angled surfaces, clips, snaps, apertures or the like, as may be useful for particular applications. Moreover, pad 42 may be manufactured with any peripheral shape, such as a disk, an oblong, a triangle, etc., that defines a planar expanse. Pad 42 is not a closed or an endless loop, meaning that end regions 54 and 56 are positioned opposite one another across planar span 58.

Pad 42 may be manufactured of an absorbent textile material, such as needlefelt. Needlefelt is a non-woven textile produced by mechanically, chemically or thermally interlocking layers of fibers, filaments or yarns, in a process called needle punching on a needle loom machine. Pad 42 may be impregnated with a lubricating fluid, such as a low-viscosity lubricating oil. The oil may be drawn out of the pad through capillary action and deposited onto the sliding surface of the carriage rod 36 as necessary. Pad 42 may be impregnated with a sufficient amount of lubricating fluid such that pad 42 will lubricate the carriage rod throughout the life of the printer. In other embodiments, pad 42 may be periodically cleaned, lubricated and/or replaced throughout the life of the printer.

Figure 3:
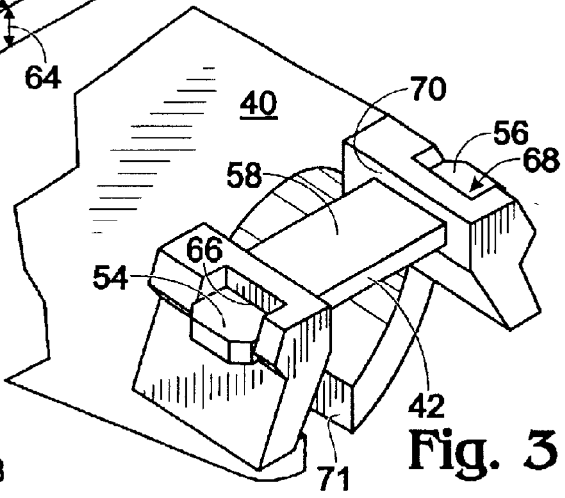
FIG. 3 is a perspective view of the lubricating structure of FIG. 2 installed on a printhead carriage according to an embodiment of the present invention.

FIG. 3 illustrates pad 42 secured within printhead carriage 40. Printhead carriage 40 includes first and second slots, also called securement devices 66 and 68, adapted for receiving therein first and second end regions 54 and 56, respectively, of pad 42. In the embodiment shown, first and second end regions 54 and 56 of pad 42 are secured within slots 66 and 68 by friction due to the tight fit of the pads within the slots 54 and 56. In other embodiments, securement devices 66 and 68 may comprise angled surfaces, clips, snaps, apertures or the like, as may be useful for particular applications, and manufactured so as to mate with the securement device positioned in end regions 54 and 56 of pad 42. Positioned between securement device 66 and 68 on carriage 40 is an aperture or open region 70 that allows access to, and deflection of, central region 58 of pad 42. Accordingly, pad 42 is "simply supported" by the printhead carriage 40, i.e., supported only at end regions 54 and 56 of the pad, much like a beam, such that central region 58 is generally unconstrained by the printhead carriage. In other words, central region 58 is exposed for contact with carriage rod 36 and is free to deflect in response to contact with the carriage rod. In this figure, pad 42 is tautly secured within printhead carriage 40 and is not in contact with carriage rod 36 and, therefore, is in its nominally flat, planar orientation. Printhead carriage 40 is shown having an open region 71 such that the printhead carriage does not completely surround a carriage rod or support member upon which the printhead carriage may be mounted.

Figure 4:
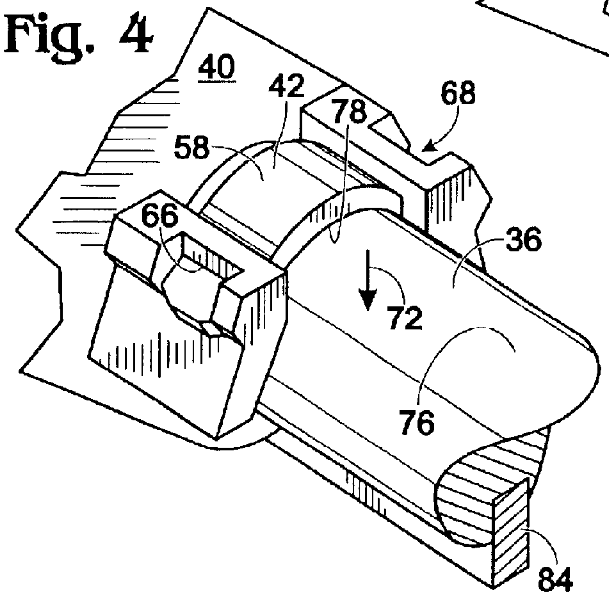
FIG. 4 is a cross sectional perspective view of the lubricating structure of FIG. 2 and the printhead carriage of FIG. 3 mounted on a carriage rod according to an embodiment of the present invention.
Figure 5:
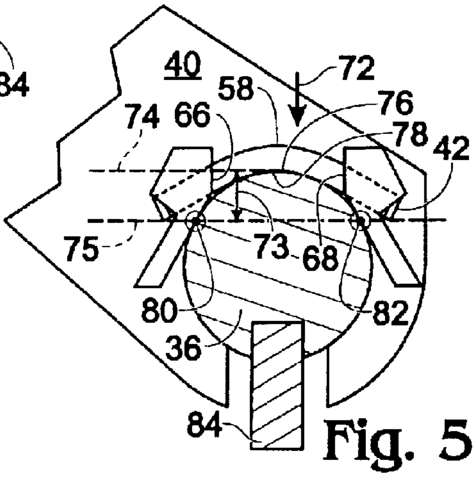
FIG. 5 is an end view of the lubricating structure, printhead carriage, and carriage rod of FIG. 4 according to an embodiment of the present invention.

FIGS. 4 and 5 illustrate printhead carriage 40 mounted on carriage rod 36 such that slots 66 and 68 are positioned generally on opposite sides of the carriage rod 36. In one embodiment, printhead carriage 40 may be mounted on carriage rod 36 by mounting means (not shown) separate from pad 42, wherein the mounting means ensures proper movement of the printhead carriage along carriage rod 36. In another embodiment, the printhead carriage 40 may include more than one pad 42, such as a first pad secured on one side of the printhead carriage 40 and a second pad secured on an opposite side of the printhead carriage 40. In such an embodiment, the carriage rod 36 is lubricated and/or cleaned on both sides of the printhead carriage 40 as the carriage moves along the carriage rod 36.

Carriage rod 36 may comprise a generally circular cross sectional shape but any shaped cross section of carriage rod 36 may be utilized. For example, carriage rod 36 may comprise a square, an oval or a rectangular cross-shaped shaft. Rod 36 may also comprise an inverted "U" shaped cross-sectional shape, wherein the rod is supported along its length by a bar received within the lower recess of the carriage rod. Support of carriage rod 36 entirely along its length may reduce vibrational and positional errors of the printhead carriage, and a printhead supported thereon, during printing as the printhead carriage is moved along the carriage rod.

Still referring to FIGS. 4 and 5, slots 66 and 68 of printhead carriage 40 may be positioned slightly lower, in a direction 72, than a plane 74 (shown in end view as a line in FIG. 5) defined by a topmost portion of a pad contacting surface 76 of carriage rod 36, such that a rod contacting surface 78 of pad 42 contacts pad contacting surface 76 of the carriage rod, as will be described subsequently in greater detail. In the embodiment shown, slots 66 and 68 are aligned with a plane 75 (shown in end view as a line in FIG. 5) that defines a lowermost portion of pad contacting surface 76, as will be described in more detail below. This offset of slots 66 and 68 with the topmost portion of rod 36 is chosen so as to force the pad 42 to deflect slightly from its nominally flat orientation when the pad contacts the carriage rod 36, thereby providing a controlled pre-load, i.e., a predetermined contact force between the pad contacting surface 76 of the carriage rod 36 and the rod contacting surface 78 of nominally planar pad 42. The controlled pre-load ensures that the lubricated pad 42 is pressed against the pad contacting surface 76 of the carriage rod 36 with enough force and surface area so as to impart a desired amount of oil to the carriage rod 36 without significantly increasing drag between the printhead carriage 40 and the carriage rod 36. In the embodiment shown, rod contacting surface 78 of central region 58 of pad 42 deflects upwardly approximately 1.5 mm, a dimension similar to the thickness 64 of the pad, i.e., a deflection distance approximately 1 times the thickness of the pad 42. The amount of deflection 73 (shown in FIG. 5) of pad 42 may be measured from the peak of the curved portion of central region 58 during deflection, shown here as plane 74, to plane 75 defined by the pad in its nominally planar orientation. Pad 42 generally is manufactured of a material, and mounted on printhead carriage 40, such that central region 58 is adapted to deflect a distance 73 in a range of approximately 0.1 to 4.0 times the pad's thickness 64, and more particularly, in a range of approximately 0.5 times to 1.5 times the pad's thickness 64. In other words, in the embodiment shown, the pad's thickness 64 is 1.5 mm and the pad 42 is adapted to deflect a distance 73 in a range of approximately 0.75 mm to 2.25 mm from its nominally flat orientation. In other embodiments, the pad 42 may be pre-loaded to deflect to a lesser or to a larger degree, and in a direction other than upwardly, such as, for example, downwardly if mounted below a support rod or to the side if mounted on the side of a support rod, as may be desired for a particular application.

In addition to applying lubricating oil to working surface 76 of the carriage rod 36, pad 42 physically wipes the pad contacting surface 76 of rod 36 so as to remove contaminants therefrom. Pad 42, therefore, lubricates and cleans carriage rod 36, thereby reducing frictional drag on the carriage rod and increasing the life of the printer. By "pad contacting surface" 76 of the carriage rod, Applicants generally mean the portion of the outer surface of the carriage rod used to support the printhead carriage 40. In the embodiment shown, the pad contacting surface 76 of carriage rod 36 comprises approximately one fifth of the circumference of the generally cylindrically shaped carriage rod, extending upwardly and around the top surface of carriage rod 36, approximately from line 80 to line 82 (both lines shown in end view in FIG. 5). In other embodiments, the pad contacting surface of the carriage rod 36 may comprise any portion less than 100% of the outer periphery of the carriage rod, as for example, within a range of 0 to 50% of the outer periphery or perimeter of the carriage rod 36. Pad 42 generally does not contact the entire outer periphery of carriage rod 36 but only contacts the carriage rod in a portion of the periphery, i.e., rod contacting surface 78 of the pad 42 only contacts rod 36 along pad contacting surface 76 of the rod 36. In one embodiment, pad contacting surface 76 of rod 36 and rod contacting surface 78 of pad 42 are contiguous with one another such that the entire pad contacting surface of the rod is cleaned and lubricated while producing a reduced amount of friction on the rod when compared to the friction produced by prior art closed pads which entirely surround and frictionally engage a carriage rod. Moreover, because planar pad 42 only contacts a portion of the entire periphery of the rod, the rod may be supported along its length, such as along a lower or a side surface of the rod 36 by a cross bar 84, thereby reducing vibration of the rod 36 and the printhead carriage 40 as it moves along the rod.

The nominally planar lubricating pad 42 provides many benefits. The pad 42 limits migration of lubricants from the pad during use because it utilizes capillary action to dispense the lubricant to the carriage rod 36 during use. Contact of the pad 42 with only the forward most portion, or the pad contacting surface 76, of the carriage rod reduces the printhead carriage drag's sensitivity to pad geometry, thereby increasing consistency of operation between similarly manufactured printers. In other words, slight variations in the inner diameter of closed pads of the prior art may result in inconsistent drag forces, whereas slight variations in the length of the planar pad 42 shown may be compensated for when the pad is secured within slots 66 and 68 of the printhead carriage 40. The pad 42 lubricates and cleans the pad contacting surface 76 of the carriage rod 36 in a single motion. Moreover, the planar pad geometry allows the carriage rod 36 to be supported completely or periodically along its length, thereby allowing different mounting methods that may reduce carriage rod vibrations so as to improve positional accuracy and overall print quality.

Although a specific embodiment has been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described herein without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

We claim:

1. A lubricating system, comprising:

a flexible, nominally planar lubricating structure including first and second end regions and a central region positioned therebetween, the structure impregnated with a lubricating fluid and adapted for securement to a printhead carriage only at said first and second end regions.

2. A lubricating system according to claim 1 wherein said structure defines a generally rectangular expanse and wherein said first and second end regions are positioned opposite one another across said rectangular expanse.

3. A lubricating system according to claim 1 wherein said structure is manufactured of needlefelt.

4. A lubricating system according to claim 1 wherein said structure defines a width dimension, a length dimension and a thickness dimension, wherein said thickness dimension is at least 10% of said length dimension and said width dimension is at least 50% of said length dimension.

5. A lubricating system according to claim 1 wherein said structure defines a length, and wherein said central region extends along at most 80% of said length.

6. A lubricating system according to claim 1 further comprising a printhead carriage mounted on a carriage rod, wherein said structure is secured to said printhead carriage only at said first and second end regions such that said central region is flexed from its nominally planar orientation upon contact with said carriage rod.

7. A lubricating system according to claim 1 wherein said lubricating structure defines a length and wherein said first and second end regions together comprise at least 20% of said length.

8. A printing mechanism, comprising:

a printhead carriage including first and second securement structures; and a lubricating pad including a first end secured to said first securement structure and a second end secured to said second securement structure such that a central region of said pad does not contact said printhead carriage and is adapted for deflection from a nominally planar orientation.

9. A printing mechanism according to claim 8 wherein said lubricating pad defines a nominally planar expanse, and wherein said central region is adapted to deflect a distance in a direction substantially orthogonal to the planar expanse in a range of approximately 0.5 times to 1.5 times the pad's thickness.

10. A printing mechanism according to claim 8 wherein said lubricating pad is manufactured of felt, is impregnated with a lubricating oil and is adapted to impart said lubricating oil from said pad by capillary action.

11. A printing mechanism according to claim 8 further comprising a carriage rod, wherein said printhead carriage is movably secured to said carriage rod and wherein only a pad contacting surface of said carriage rod contacts said lubricating pad and deflects said central region of said lubricating pad from its nominally planar orientation.

12. A printing mechanism according to claim 8 wherein said first and second securement structures define a plane, wherein said central region of said pad in said nominally planar orientation is positioned in said plane, and wherein said central region of said pad is adapted for deflection outwardly from said plane.

13. A lubricating system, comprising:

a guide member adapted for movably supporting a printhead device, said guide member including a cross section that defines an outer surface;

a pliable lubricating structure simply supported at opposite ends thereof and contacting said guide member only in a portion of said outer surface of said guide member.

14. A lubricating system according to claim 13 wherein said lubricating structure is manufactured of a non-woven textile of interlocking fibers.

15. A lubricating system according to claim 13 wherein a guide member contacting region of said lubricating structure is deflected by said guide member from a nominally flat orientation.

16. A lubricating system according to claim 13 further comprising:

a printhead device supported by said guide member;

said pliable lubricating structure operatively connected to said printhead device; and a second pliable lubricating structure operatively connected to said printhead device opposite said printhead device from said pliable lubricating structure and contacting said guide member only in said portion of said outer surface of said guide member.

17. A printing mechanism, comprising:

printing means for printing an image on a print medium;

support means for movably supporting said printing means thereon; and friction reducing means simply supported by said printing means such that only a portion of said friction reducing means contacts said support means and is deflected by said support means from a nominally flat orientation.

18. A printing mechanism according to claim 17 wherein said printing means comprises a printhead carriage that supports an inkjet printhead thereon.

19. A printing mechanism according to claim 17 wherein said support means comprises a generally cylindrical carriage rod that extends through a printzone, and wherein said carriage rod is supported at multiple locations along said printzone.

20. A printing mechanism according to claim 17 wherein said support means comprises a carriage rod that is supported along its length in a first portion of an outer surface of said rod, and wherein said friction reducing means contacts said carriage rod only in a second portion of said outer surface of said rod.

21. A printing mechanism according to claim 20 wherein said second portion comprises less than 50% of said outer surface.

22. A printing mechanism according to claim 17 wherein said friction reducing means contacts said support means with a predetermined contact force such that said friction reducing means imparts a desired amount of oil to said support means without increasing a drag of the friction reducing means on said support means.

23. A method of lubricating a support member, comprising:

providing an elongate support member adapted for movably mounting a printing structure thereon;

providing a nominally planar lubricating structure simply supported at opposite ends thereof, said lubricating structure impregnated with a lubricating fluid;

placing said lubricating structure in contact with said support member; and moving said lubricating structure along said elongate support member to impart lubricating fluid thereto.

24. A method according to claim 23 further comprising movably mounting a printing structure on said support member, wherein said step of providing a lubricating structure comprises securing said lubricating structure to said printing structure at opposite ends of said lubricating structure such that only a central portion of said lubricating structure contacts said support member and is deflected thereby.

25. A method according to claim 23 wherein said step of placing said lubricating structure in contact with said support member produces a predetermined contact force between said lubricating structure and said support member such that said lubricating structure emits said lubricating fluid to said support member via capillary action.

26. A method according to claim 23 wherein said step of moving said lubricating structure along said elongate support member removes debris from said support member.

27. A printing mechanism, comprising:

a housing:

an elongate, generally cylindrical carriage rod supported generally along its length within said housing;

a printhead carriage that supports a printhead thereon, said printhead carriage movably supported on said carriage rod for movement therealong; and a lubricating pad manufactured of a flexible, nominally planar textile material including first and second end regions and a central region positioned therebetween, said pad impregnated with a lubricating fluid and adapted for securement to said printhead carriage only at said first and second end regions such that said central region is generally unconstrained and is adapted for contacting only an upper portion of said carriage rod as said printhead carriage moves therealong.

* * * * *